US010170736B2

(12) United States Patent
Cho et al.

(10) Patent No.: US 10,170,736 B2
(45) Date of Patent: Jan. 1, 2019

(54) BATTERY CASE

(71) Applicant: Samsung SDI Co., Ltd., Yongin-si, Gyeonggi-do (KR)

(72) Inventors: Man-Sik Cho, Yongin-si (KR); Kwang-Soo Bae, Yongin-si (KR); Sun-Hye Hu, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 1021 days.

(21) Appl. No.: 14/546,971

(22) Filed: Nov. 18, 2014

(65) Prior Publication Data

US 2015/0140364 A1 May 21, 2015

(30) Foreign Application Priority Data

Nov. 21, 2013 (KR) .................. 10-2013-0142040

(51) Int. Cl.
H01M 2/10 (2006.01)
H01M 10/0525 (2010.01)

(52) U.S. Cl.
CPC ....... *H01M 2/1022* (2013.01); *H01M 2/1055* (2013.01); *H01M 10/0525* (2013.01); *H01M 2200/00* (2013.01)

(58) Field of Classification Search
CPC ........... H01M 10/425; H01M 10/4257; H01M 2/1055
See application file for complete search history.

(56) References Cited

U.S. PATENT DOCUMENTS 6,071,639 A * 6/2000 Bryant ............... H01M 2/1022
429/100
2011/0003193 A1 1/2011 Park et al.

FOREIGN PATENT DOCUMENTS

KR 10-2011-0002355 A 1/2011
KR 10-2013-0034596 A 4/2013

* cited by examiner

Primary Examiner — Barbara L Gilliam
Assistant Examiner — Nathanael T Zemui
(74) Attorney, Agent, or Firm — Knobbe Martens Olson & Bear LLP

(57) ABSTRACT

A battery case is disclosed. In one aspect, the battery case includes a front case and an attaching/detaching mechanism. The front case includes a first surface corresponding to a front end portion of a battery module placed in parallel to a bottom surface thereof, and a first flange portion extending toward the battery module from the periphery of the first surface, the first flange portion having an opening formed in an upper surface thereof. The attaching/detaching mechanism includes an elastic member positioned between the front case and a front end portion of the battery module, cover members respectively surrounding both ends of the elastic member, an extending member extended upward from one area of each cover member, and a press member respectively formed toward both the ends of the elastic portion at end portions of the extending member.

17 Claims, 6 Drawing Sheets

BATTERY CASE

CROSS-REFERENCE TO RELATED APPLICATIONS

This application claims priority to and the benefit of Korean Patent Application No. 10-2013-0142040, filed on Nov. 21, 2013, in the Korean Intellectual Property Office, the entire contents of which are incorporated herein by reference in their entirety.

BACKGROUND

Field

The described technology generally relates to a battery case, and more particularly, to a battery case which accommodates at least one battery cell.

Description of the Related Technology

As portable electronic devices become smaller and lighter, many studies have recently been conducted to develop secondary batteries used as driving power sources of the portable electronic devices. Since secondary batteries are rechargeable, they are more economical than primary batteries. In addition, secondary batteries can be small in size and large in capacity. They also have high operating voltages and a high energy density per unit weight. Due to these advantages, the secondary batteries are widely used in high tech electronic device fields.

Generally, it is difficult to use only one battery cell as the only power source for an electronic device such as a personal computer, a cellular phone, an electric vehicle, an electric tool or similar electronic devices. Therefore, the power source employed in such devices typically includes a battery module formed by connecting multiple battery cells in series and/or parallel in order to obtain the desired voltage and capacity.

In the standard secondary batteries, the serial and/or parallel connection of the plurality of battery cells is performed through welding using connection tabs. In addition, a protective circuit module (PCM) such as a charging/discharging control circuit and/or a protection circuit can be connected to the battery module. At least one battery module having the PCM connected thereto is accommodated in an external case, thereby forming a battery pack.

SUMMARY OF CERTAIN INVENTIVE ASPECTS

One inventive aspect is a battery case having an elastic member operated when a battery pack is attached/detached to/from an electric tool main body, which can prevent the elastic member from being separated by forming an insulating member between the elastic member and a battery module.

Another aspect is a battery case, including: a front case configured to have a first surface corresponding to one end portion of a battery module disposed in parallel to a bottom surface thereof, and a first flange portion extended in a predetermined length toward the battery module from the circumference of the first surface, the first flange portion having an opening formed in an upper surface thereof; a top case configured to have a second surface corresponding to the opening of the first flange portion of the front case and a top of the battery module, and a second flange portion extended in a predetermined length toward the top of the battery module from the circumference of the second surface, the second flange portion having one side connected to the first flange portion along an edge portion of the opening; and an attaching/detaching means configured to have an elastic member positioned between the front case and the one end portion of the battery module, cover members respectively surrounding both ends of the elastic member, an extending member extended upward from one area of each cover member, and a press member respectively formed toward both the ends of the elastic portion at end portions of the extending members.

A pair of first through-holes may be respectively formed in both opposite side surfaces of the first flange portion, and a pair of second through-holes may be respectively formed in both opposite side surfaces of the second flange portion positioned on a top of the first flange portion.

The cover members may be respectively inserted into the first through-holes, and the press members may be respectively inserted into the second through-holes.

An insulating member may be formed between the attaching/detaching means and the one end portion of the battery module.

A fixing member protruded toward the first surface of the front case may be formed in an upper area of the insulating member, and a lower end portion of the insulating member may be bent toward the first surface of the front case to surround the elastic member.

Mounting portions for respectively accommodating the fixing member and the lower end portion of the insulating member may be formed on the first surface of the front case.

A guide member protruded toward the battery module may be formed in one area of the first surface of the front case, and a third through-hole having the guide member passing therethrough may be formed in the insulating member.

The elastic member may have elasticity in directions toward both the side surfaces of the first flange portion.

Stoppers protruded in a predetermined length from surfaces opposite to each other may be respectively formed at the extending members.

A protective circuit module may be mounted on the top of the battery module, and the top case may cover an area in which the protective circuit module is positioned.

The front case and the top case may be integrally formed.

The battery case may further include a rear case configured to surround the battery module, the rear case being coupled to the front case and the top case.

The rear case may be formed of an aluminum material.

The rear case may have a surface formed to be rough.

Another aspect is a battery case, comprising a front case, a top case, and an attaching/detaching mechanism. The front case comprises a first surface corresponding to a front end portion of a battery module configured to be placed in substantially parallel to a bottom surface of the first surface; and a first flange portion configured to extend toward the battery module from a periphery of the first surface. The first flange portion has an opening formed in an upper surface thereof. The top case comprises a second surface corresponding to the opening of the first flange portion and a top of the battery module, and a second flange portion configured to extend toward the top of the battery module from the periphery of the second surface, the second flange portion having one side connected to the first flange portion along edge portions of the opening. The attaching/detaching mechanism, configured to be attached and detached from the front case, comprises an elastic member configured to be positioned between the front case and the front end portion of the battery module, a plurality of cover members respectively at least partially surrounding opposing ends of the elastic member, an extending member extending upwardly from one area of each cover member, and a plurality of press members respectively formed toward the opposing ends of the elastic member from end portions of the extending member.

In the above battery case, a plurality of first through-holes is respectively formed in opposing surfaces of the first flange portion and a plurality of second through-holes is respectively formed in opposing surfaces of the second flange portion positioned on a top of the first flange portion. In the above battery case, the cover members are respectively inserted into the first through-holes and the press members are respectively inserted into the second through-holes.

The above battery case further comprises an insulating member formed between the attaching/detaching mechanism and the front end portion of the battery module. The above battery case further comprises a fixing member protruding toward the first surface of the front case and formed in an upper area of the insulating member and a lower end portion of the insulating member is curved toward the first surface of the front case to at least partially surround the elastic member. The above battery case further comprises a plurality of mounting portions for respectively accommodating the fixing member and the lower end portion of the insulating member and formed on the first surface of the front case. The above battery case further comprises a guide member protruding toward the battery module and formed in one area of the first surface of the front case and a third through-hole having the guide member passing therethrough is formed in the insulating member.

In the above battery case, the elastic member has elasticity in directions toward opposing surfaces of the first flange portion. The above battery case further comprises a plurality of stoppers protruding toward each other from opposing surfaces of the extending member. In the above battery case, a protective circuit module mounted on the top of the battery module and wherein the top case covers an area in which the protective circuit module is positioned. In the above battery case, the front case and the top case are integrally formed. The above battery case further comprises a rear case configured to surround the battery module, the rear case being coupled to the front case and the top case. In the above battery case, the rear case is formed at least partially of an aluminum material and has an uneven surface.

Another aspect is a battery case comprising a front case and an attaching/detaching mechanism. The front case has a first surface corresponding to a front end portion of a battery module configured to be placed in a bottom surface of the front case, and a first flange portion extending toward the battery module from a periphery of the first surface, the first flange portion having an opening formed in an upper surface thereof. The attaching/detaching mechanism, configured to be attached and detached from the front case, comprises an elastic member configured to be positioned between the front case and a front end portion of the battery module, a plurality of cover members respectively at least partially surrounding opposing ends of the elastic member, an extending member extending upwardly from one area of each cover member, and a plurality of press members respectively formed toward opposing ends of the elastic member from end portions of the extending member.

In the above battery case, the elastic member is configured to be positioned substantially perpendicular to the battery module. The above battery case further comprises a top case comprising a second surface corresponding to the opening of the first flange portion and a top of the battery module, and a second flange portion configured to extend toward the top of the battery module from a periphery of the second surface, the second flange portion having one side connected to the first flange portion along edge portions of the opening. The above battery case further comprises a fixing member protruding toward the first surface of the front case and formed in an upper area of the insulating member and wherein a lower end portion of the insulating member is curved toward the first surface of the front case to at least partially surround the elastic member.

Another aspect is a battery case comprising a first case, an attaching/detaching mechanism, and a second case. The attaching/detaching mechanism, configured to be attached to and detached from the first case, comprises an elastic member extending in a first direction. The second case is connected to the first case and configured to accommodate a plurality of battery cells extending in a second direction that crosses the first direction.

The above battery case further comprises an insulating member configured to be formed between the elastic member and the battery cells so as to substantially prevent a short circuit between the elastic member and the battery cells. The above battery case further comprises a third case connected to the first and second cases, and is configured to at least partially cover the battery cells, wherein an opening is formed in an upper portion of the first case, and wherein at least a portion of the third case is inserted into the opening.

According to at least one embodiment, the separation of the elastic member is prevented by forming the insulating member between the elastic member and the battery module, so that it is possible to prevent a short circuit between the elastic member and the battery module or between the elastic member and the protective circuit module.

Further, it is possible to prevent a short circuit between the elastic member and the battery module or between the elastic member and the protective circuit module, thereby improving the stability of the battery pack.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be either the only element between the two elements, or one or more intervening elements may also be present. Like reference numerals refer to like elements throughout.

DETAILED DESCRIPTION OF CERTAIN INVENTIVE EMBODIMENTS

Figure 1:
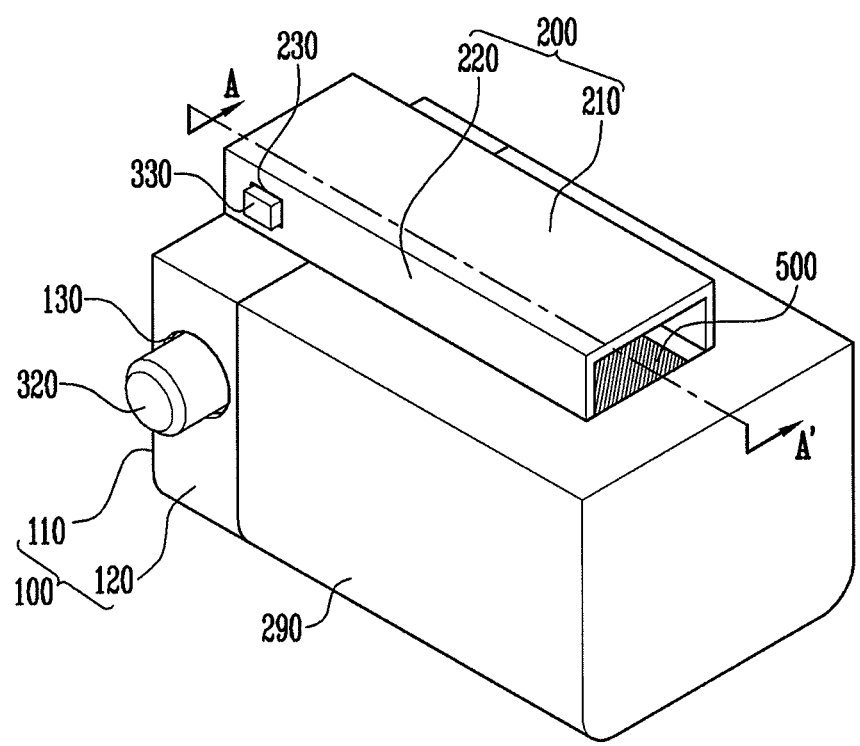
FIG. 1 is an assembled perspective view showing a battery case which accommodates a battery module and an attaching/detaching mechanism according to an embodiment.

In the following detailed description, only certain example embodiments of the described technology have been shown and described, simply for illustration. As those skilled in the art would realize, the described embodiments may be modified in various different ways, all without departing from the spirit or scope of the described technology. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements. In the drawings, the thickness or size of layers are exaggerated for clarity and not necessarily drawn to scale.

FIG. 1 is an assembled perspective view showing a battery case which includes a battery module 400 (shown in FIG. 2) and an attaching/detaching mechanism according to an embodiment.

Referring to FIG. 1, the battery case according to this embodiment includes a front case 100, a top case 200 and a rear case 290. In this embodiment, the top case 200 has one side fixed to the front case and can be integrally formed with the front case 100.

A battery module 400 placed in substantially parallel to a bottom surface of the battery case is positioned inside the battery case. The front case 100 includes a first surface 110 corresponding to a front end portion of the battery module 400. The front case 100 also includes a first flange portion 120 extending toward the battery module 400 from the periphery of the first surface 110. In these embodiments, an opening 170 is formed in a middle area of an upper surface of the first flange portion 120.

The top case 200 includes a second surface 210 attached to an edge of the opening 170 of the first flange portion 120 of the front case 100 and a top of the battery module 400. The top case 200 also includes a second flange portion 220 extending toward the top of the battery module 400 from the periphery of the second surface 210. In these embodiments, one side of the second flange portion 220 is connected to the first flange portion 120 along an edge portion of the opening 170 of the first flange portion 120. Accordingly, the opening 170 of the first flange portion 120 is covered by the top case 200. The front and top cases 100 and 200 formed as described above can be integrally formed.

A plurality of first through-holes 130 (e.g., two) are respectively formed at positions opposite to each other in side surfaces of the first flange portion 120. A plurality of second through-holes 230 (e.g., two) are respectively formed at positions opposite to each other in side surfaces of the second flange portion 220 positioned on a top of the first flange portion 120. Although not shown in this figure, a coupling member such as a rail for coupling the second flange portion 220 to an electronic device (not shown) positioned on the top of the second flange portion 220 can be formed to be electrically connected to the battery module 400.

In addition, an attaching/detaching mechanism 300 (see FIG. 2) for coupling to or separating the electronic device from a battery pack is formed inside the front case 100. Cover members 320 and press members 330 (or buttons) can be exposed to the outside of the front case 100 (e.g., the environment). The cover members 320 of the attaching/detaching mechanism 300 are respectively inserted into the first through-holes 130. The press members 330 of the attaching/detaching mechanism 300 are respectively inserted into the second through-holes 230. The configuration of the attaching/detaching mechanism 300 according to the described technology will be described in detail with reference to FIG. 2.

The battery case according to this embodiment further includes the rear case 290 configured to surround the battery module 400 positioned inside the battery case, the rear case 290 being coupled to the front and top cases 100 and 200.

Figure 2:
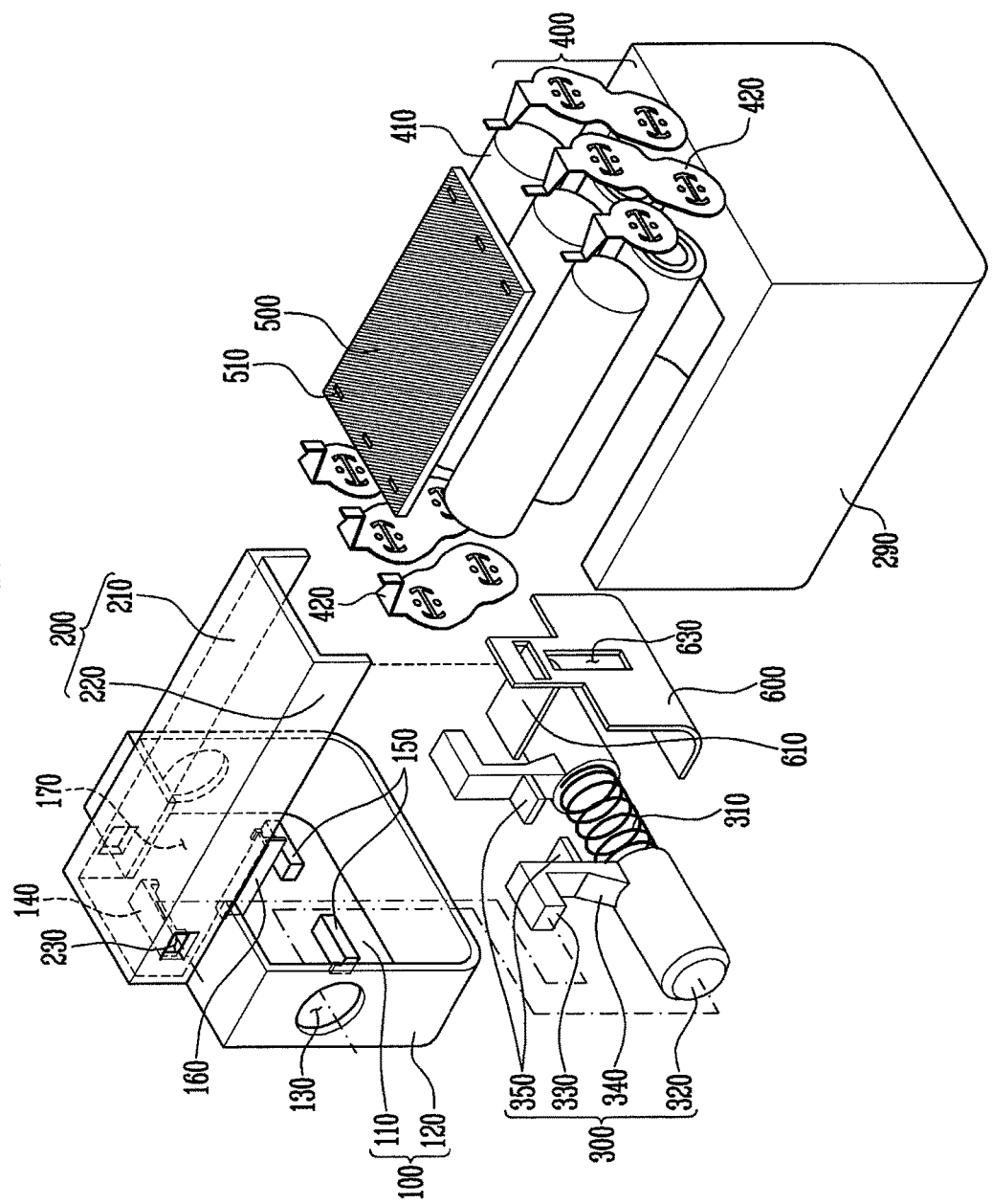
FIG. 2 is an exploded perspective view of FIG. 1.

FIG. 2 is an exploded perspective view of FIG. 1.

In some embodiments, as shown in FIG. 2, the front case 100 is integrally formed with the top case 200. The front case 100 corresponds to a front end portion and the top case 200 corresponds to a top of the battery module 400 placed in substantially parallel to the bottom surface of the battery case. The front case 100 includes a first surface 110 corresponding to the front end portion of the battery module 400. The front case 100 also includes a first flange portion 120 extending toward the battery module 400 from the periphery of the first surface 110. The top case 200 has a second surface 210 corresponding to the top of the battery module 400. The top case 200 also includes a second flange portion 220 extending toward the top of the battery module 400 from the periphery of the second surface 210.

In these embodiments, an opening 170 is formed in one area of an upper surface of the first flange portion 120, e.g., a middle area of the upper surface. One side of the second flange portion 220 is connected to the first flange portion 120 along an edge portion of the opening 170 of the first flange portion 120. Accordingly, the front case 100 and the top case 200 can be integrally formed.

A protective circuit module 500 is mounted at the top of the battery module 400 inside the battery case between the top case 200 and the battery module 400. The second surface 210 corresponding to a side of the battery module 400 can be formed in a size covering the area in which the protective circuit module 500 is positioned.

The battery module 400 includes a plurality of battery cells 410. In some embodiments, a rechargeable cylindrical lithium-ion battery is used for each battery cell 410. The battery cells 410 can be arranged into various serial and/or parallel configurations. The battery cells 410 can be electrically connected to each other via connection tabs 420. The connection tabs 420 can be formed of a conductive material such as copper or nickel.

The battery module 400 including the battery cells 410 is electrically connected to the protective circuit module 500. In the protective circuit module 500, a module to perform communication with an electronic device is mounted on a printed circuit board. A protection circuit for securing the stability of the battery module 400 in a process of charging/ discharging the battery module 400 can be mounted on the printed circuit board. At least one insertion hole 510 for electrical connection with the connection tab 420 is provided in the protective circuit module 500. In these embodiments, after the connection tab 420 is inserted into the insertion hole 510 of the protective circuit module 500, the protective circuit module 500 and the connection tab 420 are electrically connected through soldering or the like.

An attaching/detaching mechanism 300 is positioned between the front case 100 and the front end portion of the battery module 400. The attaching/detaching mechanism 300 is used to connect to or separate an electronic device from a battery pack formed on the top of the top case 200. The attaching/detaching mechanism 300 includes an elastic member 310, at least one cover member 320, at least one extending member (or spring) 340 and at least one press member 330.

Figure 7:
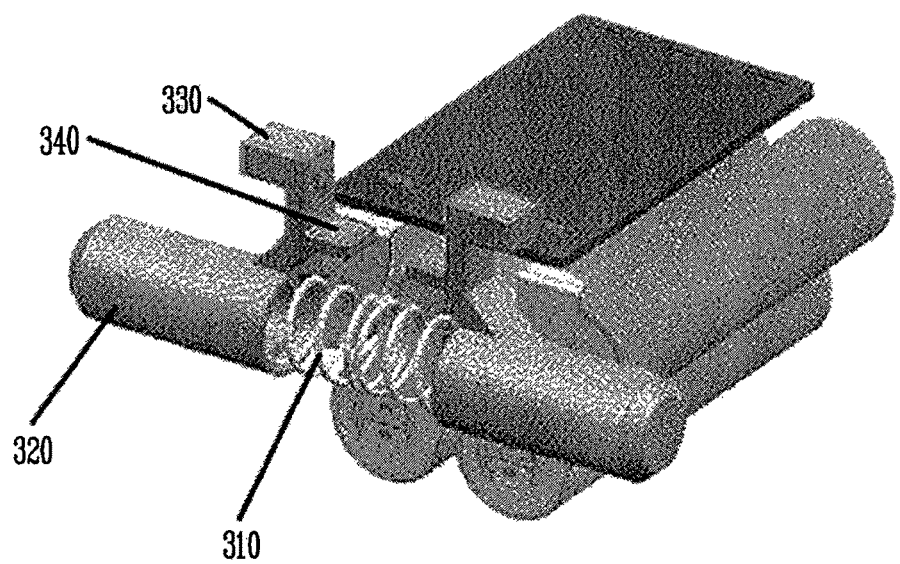
FIG. 7 is an assembled perspective showing the battery module and the attaching/detaching mechanism according to another embodiment.

In these embodiments, the elastic member 310 is positioned in directions facing opposing surfaces of the first flange portion 120. The cover members 320 cover two opposing ends of the elastic member 310. The extending member 340 extends upwardly towards the opening 170 from one area of each cover member 320. The press members 330 extend toward the opposing ends of the elastic member 310 from end portions of the extending members 340. In some embodiments, as shown in FIG. 2, the cover member 320, the extending member 340 and the press member 330 are integrally formed (see also FIG. 7).

In some embodiments, the cover member 320 is inserted into the first through-hole 130 of the first flange portion 120, and the press member 330 is inserted into the second through-hole 230 of the second flange portion 220.

Figure 8:
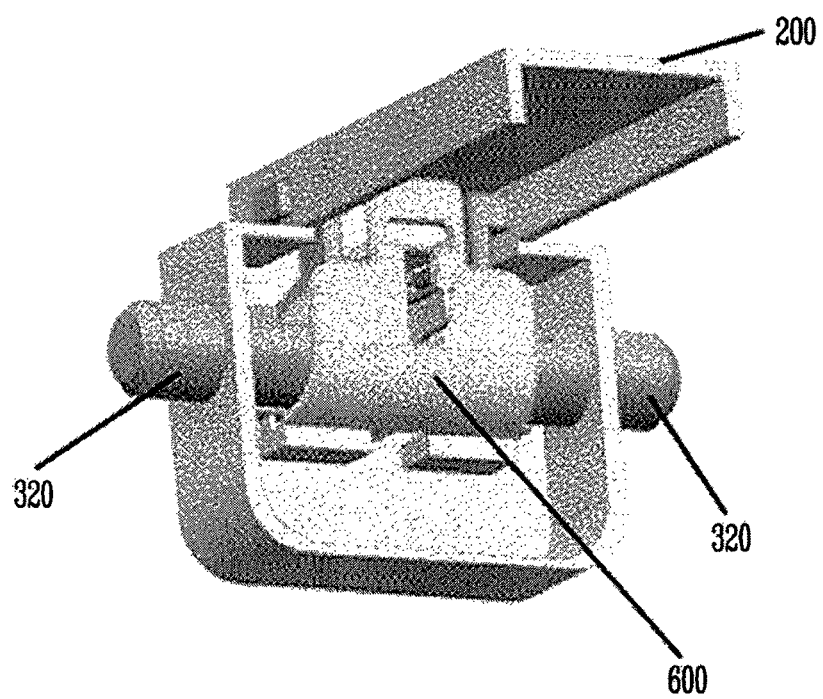
FIG. 8 is a perspective view of an insulating member curved around the elastic member according to another embodiment.

Referring to FIG. 2, an insulating member 600 is formed between the attaching/detaching mechanism 300 and the front end portion of the battery module 400 (see also FIG. 8). Accordingly, the insulating member 600 can substantially prevent the elastic member 310 from having elasticity toward the battery module 400. The insulating member 600 can also substantially prevent the elastic member 310 from being separated from the attaching/detaching mechanism 300. The insulating member 600 can be configured such that the elastic member 310 is not exposed toward the battery module 400, and guides the elastic member 310 to be smoothly operated between the side surfaces of the first flange portion 120. Accordingly, it is possible to substantially prevent a short circuit between the elastic member 310 and the battery module 400 or between the elastic member 310 and the protective circuit module 500, thereby improving the quality of the battery pack.

The insulating member 600 can be fixed to the first surface 110 of the front case 100. To this end, a fixing member 610 protruding toward the first surface 110 of the front case 100 can be formed in an upper area of the insulating member 600. In addition, a lower end portion of the insulating member 600 can be curved toward the first surface 110 of the front case 100 to surround the elastic member 310. This curvature can further substantially prevent the elastic member 310 from having elasticity toward the bottom of the front case 100.

Mounting portions 140 and 150 for accommodating the fixing member 610 and the lower end portion of the insulating member 600 are respectively formed. The mounting portions 140 and 150 can be formed at positions corresponding to the fixing member 610 and the lower end portion of the insulating member 600 on the first surface 110 of the front case 100. In some embodiments, the insulating member 600 is formed of a material having slight elasticity so that the fixing member 610 and the lower end portion of insulating member 600 are easily fixed to the mounting portions 140 and 150, respectively.

The mounting portion 140 corresponding to the fixing member 610 of the insulating member 600 can be formed to surround both side surfaces and an upper surface of the end portion of the fixing member 610. In these embodiments, the mounting portion 150 corresponding to the lower end portion of the insulating member 600 is formed with two mounting portions. Each mounting portion is formed to surround both side surfaces and a lower surface of the lower end portion of the insulating member 600. The mounting portions 140 and 150 can be formed to surround i) both the side surfaces of the fixing member 610 of the insulating member 600 and ii) both the side surfaces of the lower end portion of the insulating member 600 to fix the insulating member 600 in place so that the insulating member 600 does not laterally move.

A guide member 160 protruding toward the battery module 400 is formed in one area of the first surface 110 of the front case 100. In addition, a third through-hole 630 having the guide member 160 passing therethrough is formed in an area of the insulating member 600. An end portion of the guide member 160 is positioned adjacent to the connection tab 420 of the battery module 400. In these embodiments, it is possible to substantially prevent the battery module 400 from moving in the direction where the elastic member 310 is positioned even if the battery module 400 moves inside the battery case.

In the attaching/detaching mechanism 300, stoppers 350 protruding from opposing surfaces toward the stoppers 350 are respectively formed at of extending members 340. The stoppers 350 can substantially prevent the press members 330 from being excessively pressed when the press members 330 are pressed in order to separate the battery pack from the electronic device (not shown). It is possible to substantially prevent the press member 330 from being separated from the second through-hole 230 by controlling the position of the press member 330 in the operation of the press member 330.

Figure 3:
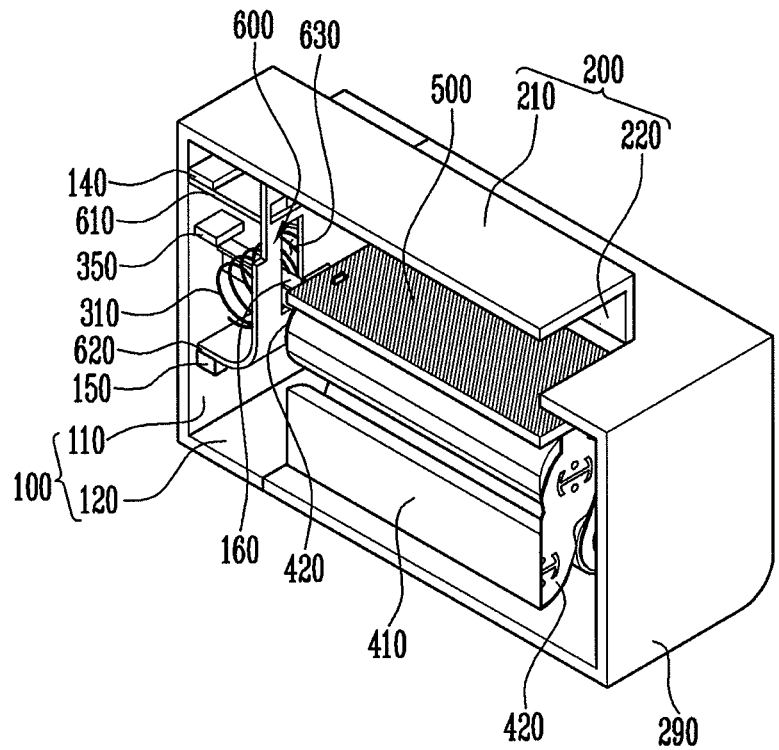
FIG. 3 is a sectional view taken along line A-A' of FIG. 1.
Figure 4:
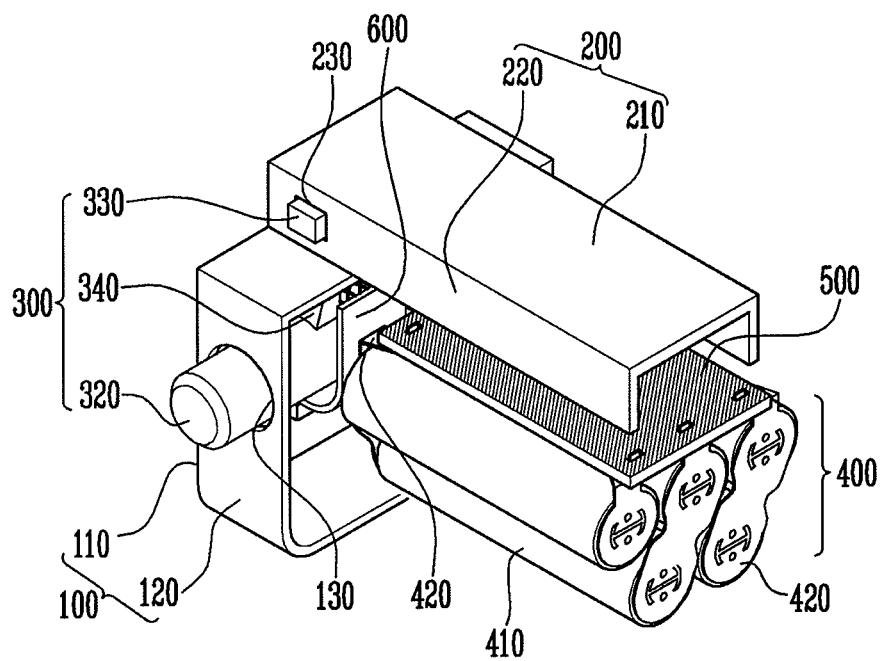
FIG. 4 is an assembled perspective view showing a state in which a rear case is removed according to the embodiment.

The battery case according to this embodiment further includes a rear case 290 configured to surround the battery module 400 positioned therein, the rear case 290 being coupled to the integrated front and top cases 100 and 200. FIG. 3 is a sectional view taken along line A-A' of FIG. 1. FIG. 4 is an assembled perspective view showing a state in which the rear case is removed without the battery module 400 according to the embodiment.

Referring to FIGS. 3 and 4, the insulating member 600 positioned between the front case 100 and the front end portion of the battery module 400 is formed to surround the elastic member 310.

In these embodiments, the fixing member 610 and the lower end portion of the insulating member 600 can be inserted and fixed to the mounting portions 140 and 150 formed on the first surface 110 of the front case 100. Such a configuration allows the insulating member 600 to be fixed to the mounting portions 140 and 150, using, for example, a hook method without using any separate screw. As the insulating member 600 is positioned between the elastic member 310 and the battery module 400 as described above, it is possible to substantially prevent the elastic member 310 from being separated during the operation of the elastic member 310.

Figure 5A:
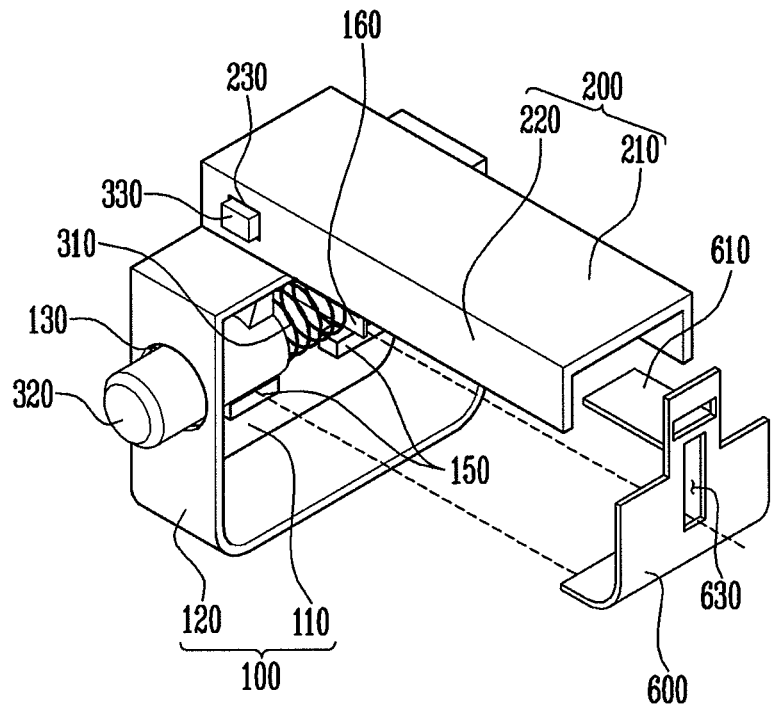
FIGS. 5A and 5B are perspective views showing positions of an elastic member according to the operation of press members of the attaching/detaching mechanism.
Figure 5B:
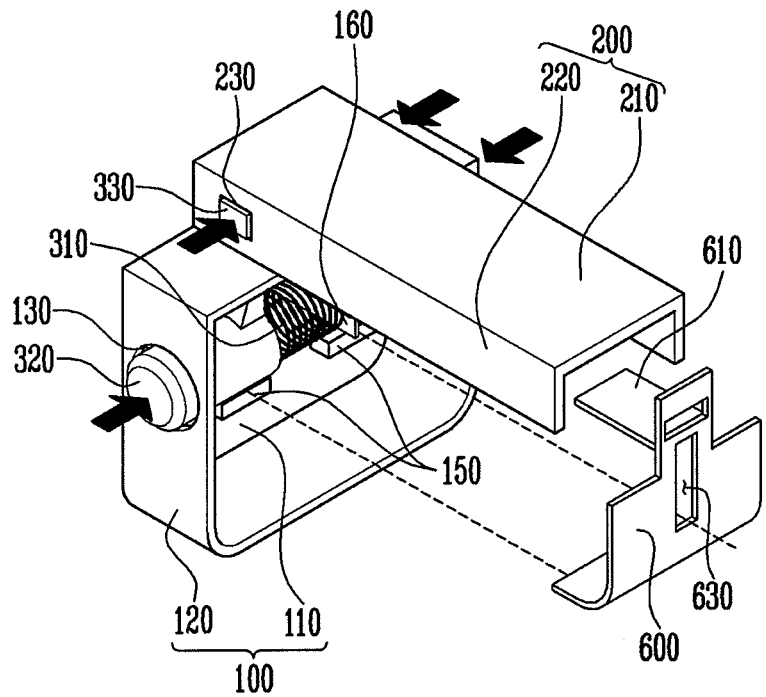

FIGS. 5A and 5B are perspective views showing positions of the elastic member 310 according to the operation of the press members 330 of the attaching/detaching mechanism 300.

Referring to FIGS. 5A and 5B, the cover member 320 of the attaching/detaching mechanism 300 is inserted into the first through-hole 130 of the first flange portion 120. Furthermore, the press members 330 of the attaching/detaching mechanism 300 are inserted into the second through-hole 230 of the second flange portion 220.

In some embodiments, when the press members 330 are pressed in order to separate the battery pack from the electronic device, the press members 330 are respectively connected to the cover members 320 surrounding opposing ends of the elastic member 310, and therefore, the elastic member 310 is contracted.

When the elastic member 310 is contracted as the press members 330 are pressed, the insulating member 600 is formed between the elastic member 310 and the battery module 400 so that it is possible for the elastic member 310 to be separated from the battery module 400. Accordingly, it is possible to substantially prevent a short circuit between the elastic member 310 and the battery module 400 or between the elastic member 310 and the protective circuit module 500 (see FIG. 3).

Figure 6:
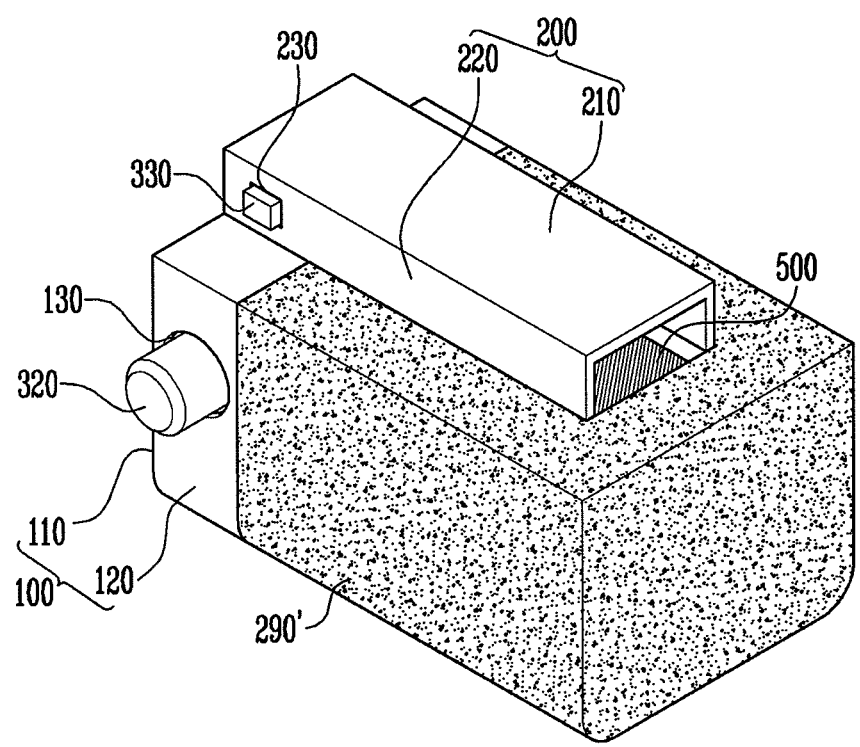
FIG. 6 is an assembled perspective view showing a battery case which accommodates a battery module and an attaching/detaching mechanism according to another embodiment.

FIG. 6 is an assembled perspective view showing a battery case which accommodates a battery module 400 (see FIG. 2) and an attaching/detaching mechanism 300 according to another embodiment.

In FIG. 6, the rear case 290' is positioned at the side where the battery module 400 (see FIG. 2) and a protective circuit module 500 are formed. Hence, the rear case 290' can be formed of a material which facilitates heat dissipation. For example, the rear case 290' can be formed of an aluminum (Al) material.

In addition, the rear case 290' can have a surface formed to be rough, (e.g., an uneven surface). Accordingly, the area of the rear case 290' can be increased so that the heat dissipation can be more easily performed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the described technology as set forth in the following claims.

What is claimed is:

1. A battery case, comprising:
   a front case comprising i) a first surface configured to face a front end portion of a battery module that is placed in a bottom surface of the battery case, and ii) a first flange portion configured to extend toward the battery module from a periphery of the first surface, the first flange portion having an opening formed in an upper surface thereof;
   a top case comprising i) a second surface facing the opening of the first flange portion and a top of the battery module, and ii) a second flange portion configured to extend toward the top of the battery module from a periphery of the second surface, the second flange portion having one side connected to the first flange portion along edge portions of the opening; and
   an attaching/detaching mechanism, configured to be attached and detached from the front case, wherein the attaching/detaching mechanism comprises i) an elastic member configured to be positioned between the first surface of the front case and the front end portion of the battery module, ii) a plurality of cover members respectively at least partially surrounding opposing ends of the elastic member, iii) an extending member extending upwardly from one area of each cover member, and iv) a plurality of press members respectively formed toward the opposing ends of the elastic member from end portions of the extending member, and wherein the number of the cover members is the same as the number of the press members.

2. The battery case of claim 1, wherein a plurality of first through-holes are respectively formed in opposing surfaces of the first flange portion and wherein a plurality of second through-holes are respectively formed in opposing surfaces of the second flange portion positioned on a top of the first flange portion.

3. The battery case of claim 2, wherein the cover members are respectively inserted into the first through-holes and wherein the press members are respectively inserted into the second through-holes.

4. The battery case of claim 1, further comprising an insulating member formed between the attaching/detaching mechanism and the front end portion of the battery module.

5. The battery case of claim 4, further comprising a fixing member protruding toward the first surface of the front case and formed in an upper area of the insulating member and wherein a lower end portion of the insulating member is curved toward the first surface of the front case to at least partially surround the elastic member.

6. The battery case of claim 5, further comprising a plurality of mounting portions for respectively accommodating the fixing member and the lower end portion of the insulating member and formed on the first surface of the front case.

7. The battery case of claim 4, further comprising a guide member protruding toward the battery module and formed in one area of the first surface of the front case and wherein a third through-hole having the guide member passing therethrough is formed in the insulating member.

8. The battery case of claim 1, wherein the elastic member has elasticity in directions toward opposing surfaces of the first flange portion.

9. The battery case of claim 1, further comprising a plurality of stoppers protruding toward each other from opposing surfaces of the extending member.

10. The battery case of claim 1, wherein a protective circuit module mounted on the top of the battery module and wherein the top case covers an area in which the protective circuit module is positioned.

11. The battery case of claim 1, wherein the front case and the top case are integrally formed.

12. The battery case of claim 1, further comprising a rear case configured to surround the battery module, the rear case being coupled to the front case and the top case.

13. The battery case of claim 12, wherein the rear case is formed at least partially of an aluminum material.

14. The battery case of claim 12, wherein the rear case has an uneven surface.

15. A battery case, comprising:
   a front case having a first surface configured to face a front end portion of a battery module that is placed in a bottom surface of the battery case, and a first flange portion extending toward the battery module from a periphery of the first surface, the first flange portion having an opening formed in an upper surface thereof; and an attaching/detaching mechanism, configured to be attached and detached from the front case, wherein the attaching/detaching mechanism comprises i) an elastic member configured to be positioned between the first surface of the front case and the front end portion of the battery module, ii) a plurality of cover members respectively at least partially surrounding opposing ends of the elastic member, iii) an extending member extending upwardly from one area of each cover member, and iv) a plurality of press members respectively formed toward opposing ends of the elastic member from end portions of the extending member, and wherein the number of the cover members is the same as the number of the press members.

16. The battery case of claim 1, wherein the plurality cover members comprise two cover members, and wherein the plurality of press members comprise two press members.

17. The battery case of claim 15, wherein the plurality cover members comprise two cover members, and wherein the plurality of press members comprise two press members.

* * * * *